Jan. 18, 1955  W. M. LEE ET AL  2,699,906
AIR INLET FOR AIRPLANE GASEOUS COMBUSTION TURBINE ENGINES
Filed Oct. 25, 1949  2 Sheets-Sheet 1
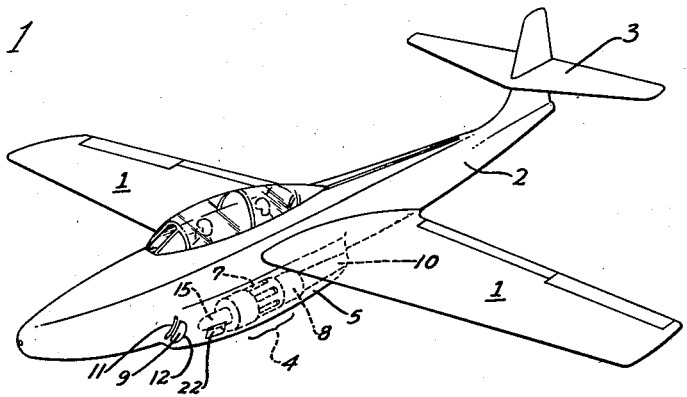
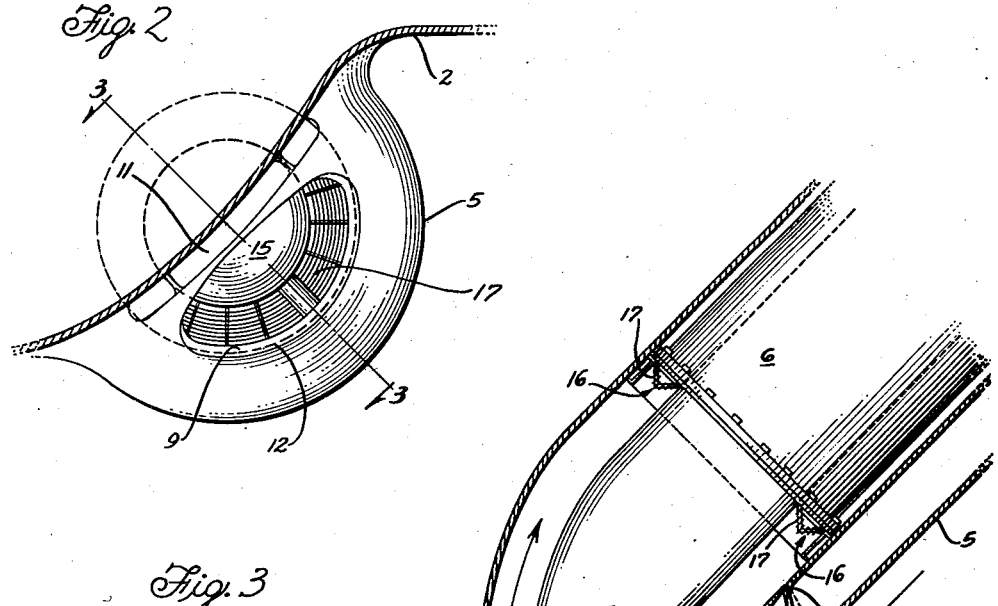
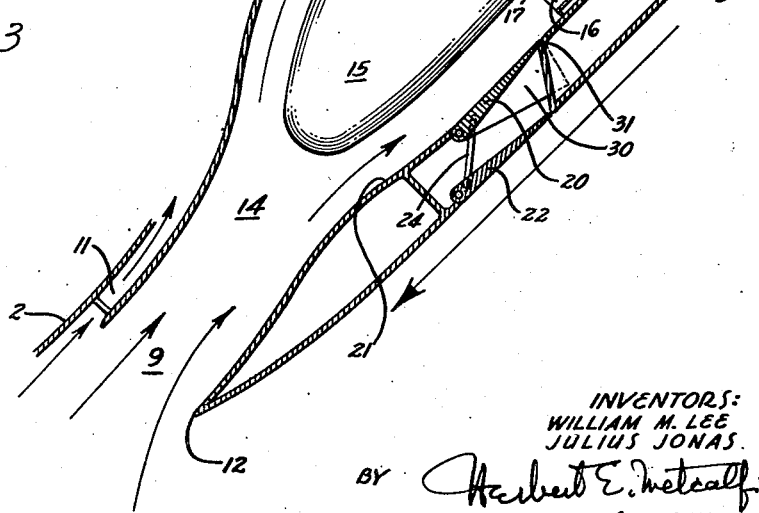
INVENTORS:
WILLIAM M. LEE
JULIUS JONAS.
BY Herbert E. Metcalf
ATTORNEY Jan. 18, 1955 W. M. LEE ET AL 2,699,906
AIR INLET FOR AIRPLANE GASEOUS COMBUSTION TURBINE ENGINES
Filed Oct. 25, 1949 2 Sheets-Sheet 2

INVENTORS:
WILLIAM M. LEE
JULIUS JONAS
BY Herbert E. Metcalf
ATTORNEY

The present invention relates to air inlets for gaseous combustion turbines installed in airplanes, and more particularly to a means for decreasing the inlet pressure loss in air inlets for such engines during airplane take-off.

In high speed airplanes utilizing engines of the gaseous combustion type, particularly those airplanes powered by gas turbines taking their compressor inlet air from the side of the fuselage, or the leading edge of a wing, the air inlets are relatively small, and usually have sharp, thin duct lips. Such inlet construction is highly desirable during cruising and high speed flight because of the consequent decreased frontal area and drag, and increased critical Mach number. At take-off, however, the performance of the gas turbines is impaired because of high unit airflow per unit inlet area, with the benefit of little or no ram pressure. In view of the desirable qualities of small engine air inlets and sharp, thin duct lips, we have found it desirable to provide a means of improving take-off performance which does not require increasing the normal inlet area or a change in duct lip contour.

It is an object of the present invention to provide a novel means for reducing pressure loss in inlets for gas turbine engines used in airplanes, at low airplane speeds.

It is another object of the invention to provide an additional inlet area for gas turbine engine inlets in airplanes to reduce pressure losses on airplane take-off.

And it is a still further object of the invention to provide an automatic means of regulating air intake area for gas turbine engines during airplane take-off.

In most airplanes equipped with gas turbine engines, a negative pressure is created inside the engine air inlet ducts due to the pressure losses in the inlet, when the airplane is standing still or moving slowly. To reduce such pressure losses, the present invention utilizes take-off doors positioned in an auxiliary duct in the side of the main-air duct wall close to the inlet of the engine compressor to direct additional atmospheric air into the compressor. Due to the additional inlet area provided in this way, the pressure loss from the atmosphere to the compressor is reduced. As the speed of the airplane increases during take-off, the pressure inside the main duct increases, and the take-off doors begin to close. At the air speed where the pressure inside the main duct adjacent the take-off doors becomes slightly greater than the local pressure on the engine nacelle adjacent the outer opening of the auxiliary duct, the doors will be completely closed. As the airspeed increases further, the pressure inside the main duct becomes higher and the outside pressure lower, so that for all reasonable air speeds the doors are firmly closed.

The invention may be more fully understood by reference to the drawings showing one preferred embodiment of the present invention solely by way of illustration, not limitation.

In the drawings:

Figure 1 is a perspective view of a U. S. Air Force F-89 airplane showing the location of the main air inlet and take-off doors of the present invention.

Figure 2 is a diagrammatic front view of the main air inlet used on the airplane of Figure 1.

Figure 3 is a diagrammatic sectional view of the air duct used in the airplane of Figure 1 showing the take-off doors closed, taken as indicated by the line 3—3 in Figure 2.

Figure 4:
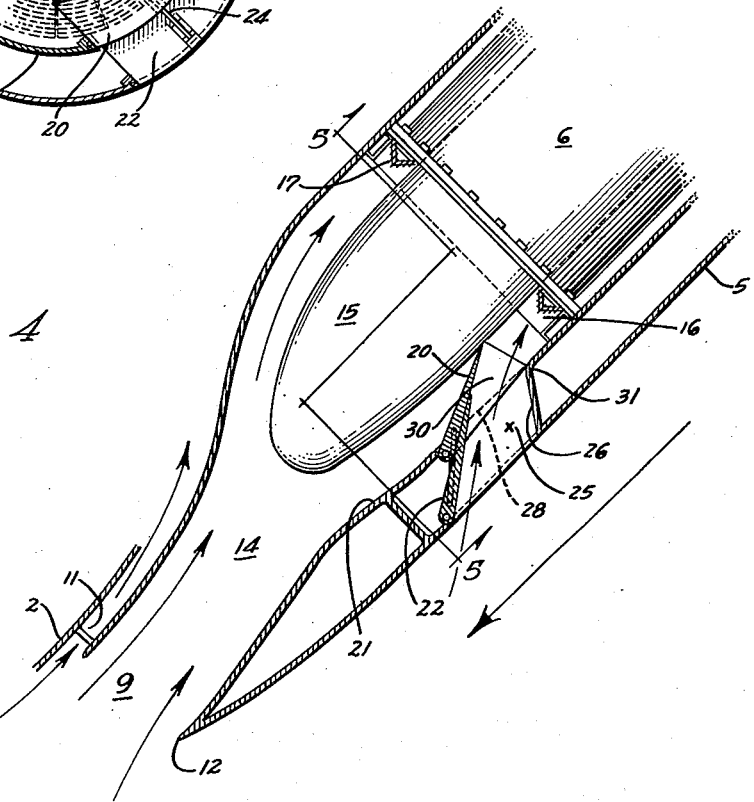
Figure 4 is a diagrammatic sectional view similar to Figure 3 showing the take-off doors open.

Referring to the drawings, Figure 1 shows a perspective view of an airplane utilizing the present invention. The airplane has wings 1 attached to fuselage 2, the latter ending in the customary tail assembly 3. The airplane is driven by two turbo-jet engines 4 positioned one on each side of the lower portion of the fuselage 2 in partial nacelles 5. The turbo-jet engines, as is usual, comprise a compressor section 6, a burner section 7 and a turbine section 8. As shown in Figures 3 and 4, the compressor 6 is of the axial flow type. Air to the compressor 6 is supplied by an air inlet 9 and the jet emerges to drive the airplane through a tail pipe 10. Boundary air is bled off the fuselage surface at the side of the air inlet 9 by the use of a boundary air slot 11.

The outer curvature of each engine nacelle 6 terminates in a sharp edge 12 at the air inlet as best shown in Figure 3. In the particular engine installation shown, the air inlet 9 is continued as a curved main air inlet duct 14 into which the accessory cone 15 of the engine projects thereby providing the main inlet duct adjacent the compressor inlet 16 with an annular form. In most jet engines, the compressor inlet 16 is provided with an annular inlet screen 17 to prevent large articles from being sucked into the compressor 6.

Such an air inlet for the compressor of jet engines is completely satisfactory when the airplane is travelling at high speeds, as ram pressure is developed in the inlet duct 14, this duct being, as shown in Figures 3 and 4, of the high velocity type, as is customarily used in conjunction with axial flow compressors. However, on the ground and at low take-off speeds, there is very little or no ram effect, and high inlet duct losses are present. The resultant decreased airflow into the compressor reduces engine thrust so that take-off performance is significantly impaired.

In order to improve the take-off performance, we provide an auxiliary air inlet in the inlet duct closely adjacent the compressor inlet 16. The action of this auxiliary air inlet is preferably completely automatic.

Figure 5:
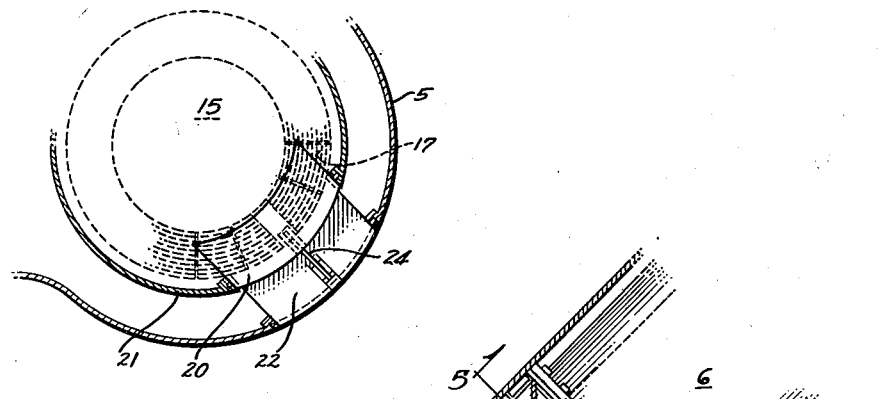
Figure 5 is a diagrammatic front elevational view of open take-off doors, taken as indicated by the line 5—5 in Figure 4.

As shown in Figures 3, 4, and 5, an inner door 20 is provided in the lining 21 of the inlet duct 14, and an outer door 22 is provided in the skin surface of the engine nacelle 5. These doors are pivoted forwardly to swing inwardly, and are preferably connected together by linkage 24 so that they move together. The doors are located so that the inner door 20, when swung inwardly, will contact the accessory cone 15 just forward of compressor inlet 16. The outer door 22 when moved inwardly overlaps the pivoted end of the inner door 20 to form a relatively smooth, rearwardly slanting forward wall of an auxiliary air inlet duct 25, as best shown in Figure 4. A rear wall 26 for this duct 25 is provided connecting the main inlet duct lining 21 with the outer nacelle skin, this rear wall also slanting rearwardly but at a slightly different angle than that of the open overlapped doors 20 and 22, to provide an external auxiliary air inlet opening 27 slightly larger than the internal opening 28 thereof.

Doors 20 and 22 have, of course, the curvatures of the main inlet duct 14 and the nacelle skin respectively, and thus do not match exactly on their overlap, nor does the inner door 20 match the cone 15, as shown in Figure 5. This mismatch, however, is not important as the main consideration is the addition of a substantial air inlet area close to the compressor inlet. While not necessary, but as a refinement, it has been found that side plates 30, when used on the inner door 20 provide more even pressure distribution around the compressor inlet periphery than if omitted. The rear wall 26 of the auxiliary air inlet duct 25 is slotted to receive these side plates 30 when the doors are closed as shown in Figure 3. Similarly, a refinement of a radius 31 is provided on the aft edge of the internal opening 28 of the auxiliary duct to cut down the turning loss about that edge. A close fit of both inside and outside doors when closed prevents both internal and external losses at high airplane speeds.

In operation, when the jet engine is started and run with the airplane the ground, a negative pressure, for example about 85% of atmospheric, is developed inside the main inlet duct 14 due to the pressure losses in the air entering the main air inlet 9. Atmospheric pressure immediately opens the doors 20 and 22, thereby directing additional air to the engine compressor through a very short duct. Thus the pressure loss from the atmosphere to the compressor is reduced and engine performance is correspondingly better. The reduction in pressure loss is also due to the fact that the auxiliary air inlet thus opened, is a much more efficient configuration for getting air to the compressor without the benefit of ram, as it is essentially a bell-mouth type of entry.

As the airplane picks up speed on take-off, the difference in the internal and external pressures becomes less and less as ram develops and when the pressure inside the main duct 14 becomes just above the local pressure on the nacelle adjacent the outer door 22 the doors will be completely closed and held closed as ram increases. Thus, for all normal flying speeds of the airplane, the doors are held firmly closed.

In one high speed U. S. Air Force airplane, the F-89 All Weather Fighter referred to above, the total pressure at the jet engine compressor inlet was raised from 89% of the ambient pressure to 95% of the ambient pressure by the use of the present invention during ground operation, and the doors in that airplane are firmly closed at all speeds above 200 M. P. H.

Thus the operation of the doors is at all times completely automatic, and the increase in engine efficiency gained by the use of the doors is obtained just when it is most useful, i. e., at take-off, and at low airplane speeds such as would be used during landings. The power available for use in a baulked landing, for example, is also increased.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

What is claimed is:

1. In an airplane driven by a gaseous combustion engine of the type having a compressor driven by a power turbine, a forwardly opening main air inlet on said airplane, a main air duct connecting said main air inlet with the inlet of said compressor, said main air duct having an inner wall adjacent an outer surface of said airplane at said compressor inlet, an auxiliary air duct between the inner wall of said main air duct and said outer surface of said airplane, said auxiliary air duct opening into said main air duct close to said compressor inlet, the length of said auxiliary air duct being substantially less than the length of said main air duct, the external opening of said auxiliary air duct being larger than the internal opening thereof to provide a bell-mouth type of entry, and a movable closure in said auxiliary air duct.

2. In an airplane driven by a gaseous combustion engine of the type having a compressor driven by a power turbine, a forwardly opening main air inlet on said airplane, a main air duct connecting said main air inlet with the inlet of said compressor, said main air duct having an inner wall adjacent an outer surface of said airplane at said compressor inlet, an auxiliary air duct between the inner wall of said main air duct and said outer surface of said airplane, said auxiliary air duct opening into said main air duct close to said compressor inlet, the length of said auxiliary air duct being substantially less than the length of said main air duct and the external opening of said auxiliary air duct being larger than the internal opening thereof to provide a bell-mouth type of entry, said auxiliary air duct slanting generally forward from inside to outside, and a movable closure in said auxiliary air duct.

3. In an airplane driven by a gaseous combustion engine of the type having a compressor driven by a power turbine, a forwardly opening main air inlet on said airplane, a main air duct connecting said main air inlet with the inlet of said compressor, said main air duct having an inner wall adjacent an outer surface of said airplane at said compressor inlet, an auxiliary air duct between the inner wall of said main air duct and said outer surface of said airplane, said auxiliary air duct opening into said main air duct close to said compressor inlet, the length of said auxiliary air duct being substantially less than the length of said main air duct and the external opening of said auxiliary air duct being larger than the internal opening thereof to provide a bell-mouth type of entry, said auxiliary air duct slanting generally forward from inside to outside with the external opening of said auxiliary air duct substantially parallel to the airflow past said external opening, and a movable closure in said auxiliary air duct.

4. Apparatus in accordance with claim 1 wherein said closure includes a first closure positioned to close the inner opening of said air duct and a second closure positioned to close the outer opening of said auxiliary air duct, said closures being mounted to swing freely inwardly on a forward pivot, and a linkage connecting said first and second closures for simultaneous movement thereof.

5. Apparatus in accordance with claim 1 wherein said closure includes a first closure positioned to close the inner opening of said air duct and a second closure positioned to close the outer opening of said auxiliary air duct, said first and second closures being mounted to swing freely inwardly on a forward pivot, and a linkage connecting said first and second closures for simultaneous movement thereof, said closures overlapping when open to provide a substantially smooth auxiliary duct forward wall.

6. Apparatus in accordance with claim 1 wherein said closure includes a first closure positioned to close the inner opening of said air duct and a second closure positioned to close the outer opening of said auxiliary air duct, said first and second closures being mounted to swing freely inwardly on a forward pivot, and a linkage connecting said first and second closures for simultaneous movement thereof, said closures overlapping when open to provide a substantially smooth auxiliary duct forward wall, the rear wall of said auxiliary duct at the internal opening thereof being rounded to reduce turning losses.

7. In an airplane driven by a gaseous combustion engine of the type having a power turbine coupled to drive a compressor, an annular air inlet to said compressor facing forwardly, a main air duct connecting said air inlet with the air inlet of said compressor and having an annular cross section for a distance forward of said annular air inlet, a forwardly slanting auxiliary air duct connecting said main air duct to the atmosphere adjacent and forward of the inlet of said compressor, and a movable closure for said auxiliary air duct pivoted forwardly on the interior wall of said main air duct and swingable inwardly under the influence of a negative pressure developed in said main air duct by operation of said compressor in the absence of ram pressure in said main air duct to block a part of the annular portion of said main air duct and to direct air entering said auxiliary air duct directly into the annular air inlet of said compressor.

8. In an airplane driven by a gaseous combustion engine of the type having a power turbine coupled to drive an axial flow compressor, an annular air inlet facing forwardly, a main air duct connecting said air inlet with the air inlet of said compressor, an axial fairing extending forward of said air inlet into said main air duct, said main air duct adjacent the inlet of said compressor being positioned a relatively short distance from an external surface of said airplane, a forwardly slanting auxiliary air duct connecting said main air duct to the atmosphere adjacent and forward of the inlet of said compressor, and a movable closure for said auxiliary air duct pivoted forwardly on the interior wall of said main air duct and swingable inwardly to contact said axial fairing to form a rearwardly slanting forward wall across and blocking a portion of said main air duct in a position to direct air entering said auxiliary air duct into the blocked portion of said annular air inlet, the size of said auxiliary inlet being such as to reduce but not completely to remove negative pressure in said main air duct in the absence of ram in said main air duct.

9. Apparatus in accordance with claim 1 wherein said closure includes a first closure positioned to close the inner opening of said air duct and a second closure positioned to close the outer opening of said auxiliary air duct, said closures being mounted to swing freely inwardly on a forward pivot.

10. Apparatus in accordance with claim 1 wherein said closure includes a first closure positioned to close the inner opening of said air duct and a second closure positioned to close the outer opening of said auxiliary air duct, said first and second closures being mounted to swing freely inwardly on a forward pivot, said closures overlapping when open to provide a substantially smooth auxiliary duct forward wall.

11. In an airplane driven by a gaseous combustion engine of the type having a power turbine coupled to drive an axial flow compressor, said compressor having an annular compressor air inlet facing forwardly, a forwardly facing main air inlet on said airplane, a main air duct connecting said main air inlet with said compressor air inlet, an axial fairing extending forwardly of said compressor air inlet into said main air duct, said main air duct adjacent said compressor inlet being positioned a relatively short distance from an external surface of said airplane, a forwardly slanting auxiliary air duct connecting said main air duct to the atmosphere adjacent and forwardly of said compressor air inlet, and a movable closure for said auxiliary air duct pivoted forwardly on the interior wall of said main air duct and swingable inwardly solely under the influence of a negative pressure developed in said main air duct by operation of said compressor in the absence of ram in said main air duct to contact said axial fairing to form a rearwardly slanting forward wall across a portion of said main air duct in a position to direct air entering said auxiliary air duct into said annular compressor air inlet.

References Cited in the file of this patent

FOREIGN PATENTS 579,657   Great Britain ---------- Aug. 12, 1946